United States Patent
Zhao

(10) Patent No.: US 11,188,565 B2
(45) Date of Patent: Nov. 30, 2021

(54) METHOD AND DEVICE FOR CONSTRUCTING SCORING MODEL AND EVALUATING USER CREDIT

(71) Applicant: ADVANCED NEW TECHNOLOGIES CO., LTD., Grand Cayman (KY)

(72) Inventor: Xing Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 606 days.

(21) Appl. No.: 15/928,248

(22) Filed: Mar. 22, 2018

(65) Prior Publication Data

US 2018/0276291 A1  Sep. 27, 2018

(30) Foreign Application Priority Data

Mar. 27, 2017 (CN) .......................... 201710188752.9

(51) Int. Cl.
  *G06F 17/30* (2006.01)
  *G06F 16/28* (2019.01)
  *G06Q 40/02* (2012.01)

(52) U.S. Cl.
  CPC ......... *G06F 16/285* (2019.01); *G06Q 40/025* (2013.01)

(58) Field of Classification Search
  CPC ............... G06F 16/285; G06Q 40/025; G06Q 10/06393; G06Q 40/00

(Continued)

(56) References Cited

U.S. PATENT DOCUMENTS 7,805,395 B2    9/2010  Howard et al.
7,912,770 B2    3/2011  Haggerty et al.
(Continued)

FOREIGN PATENT DOCUMENTS

CN    101685458 A    3/2010
CN    102063457 A    5/2011
(Continued)

OTHER PUBLICATIONS

O'Sullivan, Conor, "Finding and Visualizing Interactions", Towards Data Science, towardsdatascience.com, Jan. 16, 2016. (Year: 2016).*

(Continued)

*Primary Examiner* — Bennett M Sigmond
*Assistant Examiner* — George N. Proios

(57) ABSTRACT

Systems and methods for constructing a scoring model and evaluating user credit. An example method for constructing a scoring model may comprise: collecting a plurality of sample datasets, each sample dataset comprising at least one characteristic variable and a corresponding characteristic value; for each characteristic variable, acquiring an interaction index of the characteristic variable with each of one or more other characteristic variables, and determining a clustering index of the characteristic variable according to the interaction indices; selecting a target characteristic variable from the at least one characteristic variable according to the clustering indices of the characteristic variables; dividing the plurality of sample datasets into a plurality of sample dataset subgroups according to the target characteristic variable and the corresponding characteristic value; and constructing a corresponding sub-scoring model for each of the sample dataset subgroups.

16 Claims, 5 Drawing Sheets

(58) Field of Classification Search
USPC .......................................................... 705/38
See application file for complete search history.

(56) References Cited

U.S. PATENT DOCUMENTS

| | | | |
|---|---|---|---|
| 8,694,401 | B2 | 4/2014 | Steward |
| 8,751,273 | B2 | 6/2014 | Pinto et al. |
| 8,984,022 | B1* | 3/2015 | Crawford et al. ..... G06Q 40/08 |
| 9,355,155 | B1* | 5/2016 | Cassel et al. ....... G06F 17/3053 |
| 9,367,520 | B2* | 6/2016 | Zhao et al. ................ G06F 7/60 |
| 9,723,144 | B1 | 8/2017 | Gao et al. |
| 2003/0176931 | A1* | 9/2003 | Pednault et al. .......... G06F 7/60 700/31 |
| 2004/0220840 | A1 | 11/2004 | Bonissone et al. |
| 2005/0102228 | A1 | 5/2005 | Srinivasan et al. |
| 2007/0016542 | A1 | 1/2007 | Rosauer et al. |
| 2008/0243569 | A1 | 10/2008 | Hadden |
| 2009/0018982 | A1 | 1/2009 | Morrison |
| 2009/0119204 | A1 | 5/2009 | Akella et al. |
| 2009/0132208 | A1 | 5/2009 | Ukyo et al. |
| 2011/0184977 | A1 | 7/2011 | Du et al. |
| 2012/0239613 | A1 | 9/2012 | Danciu et al. |
| 2012/0296804 | A1 | 11/2012 | Stibel et al. |
| 2013/0166436 | A1 | 6/2013 | Eze |
| 2014/0006255 | A1 | 1/2014 | Haggerty et al. |
| 2014/0129261 | A1 | 5/2014 | Bothwell et al. |
| 2014/0156501 | A1 | 6/2014 | Howe |
| 2014/0180649 | A1 | 6/2014 | Zhao et al. |
| 2014/0330706 | A1 | 11/2014 | Tuan et al. |
| 2014/0344069 | A1 | 11/2014 | Haggerty et al. |
| 2014/0365356 | A1* | 12/2014 | Gao et al. ............ G06Q 40/025 705/38 |
| 2015/0178829 | A1 | 6/2015 | Weiss |
| 2015/0235321 | A1 | 8/2015 | Unser et al. |
| 2016/0048766 | A1* | 2/2016 | McMahon et al. .... G06N 5/047 |
| 2016/0055589 | A1 | 2/2016 | Billings |
| 2016/0189293 | A1 | 6/2016 | Christiansen et al. |
| 2016/0225073 | A1* | 8/2016 | Xio et al. ............... G06Q 40/02 |

FOREIGN PATENT DOCUMENTS

| | | |
|---|---|---|
| CN | 103377296 A | 10/2013 |
| CN | 105354210 A | 2/2016 |
| EP | 2816524 A | 12/2014 |
| JP | 2002-169958 A | 6/2002 |
| TW | 201506828 A | 2/2015 |
| WO | 2006/046737 A1 | 5/2006 |

OTHER PUBLICATIONS

Gtotenhuis, M, et al., Dummy Variables and their interactions in regression: examples on research on body mass index, arxiv.org, 2015. (Year: 2015).*
International Preliminary Report on Patentability for PCT Application No. PCT/US2018/023692 dated Jul. 2, 2019 (25 pages).
Non-Final Office Action and Search Report for Taiwanese Application No. 106139138 dated Jun. 17, 2019 (7 pages).
Written Opinion of the International Preliminary Examining Authority for Application No. PCT/US2018/023692, dated Feb. 15, 2019 (6 pages).
International Search Report and Written Opinion for Application No. PCT/US2018/023692, dated May 14, 2018, 12 pages.
Office Action for Korean Application No. 10-2019-7026057 dated Jan. 19, 2021.
Office Action for Japanese Application No. 2019-553069 dated Dec. 1, 2020.
First Search for Chinese Application No. 201710188752.9 dated Aug. 7, 2020.
Written Opinion for Singapore Application No. 11201907663X dated Sep. 28, 2020.

* cited by examiner

METHOD AND DEVICE FOR CONSTRUCTING SCORING MODEL AND EVALUATING USER CREDIT

CROSS REFERENCE TO RELATED APPLICATIONS

The present application is based on and claims priority to the Chinese Application No. 201710188752.9, filed Mar. 27, 2017, the entire contents of which are incorporated herein by reference.

TECHNICAL FIELD

The present application relates to the field of computer technologies, and in particular, to methods and devices for constructing a scoring model and evaluating user credit.

BACKGROUND

In existing technologies, a modeling method such as logic regression or scoring card is usually used to construct a scoring model. However, for the above modeling methods, there is usually assumed no interaction relationship among the variables. When there is an interaction relationship between some variables, a method of clustering and modeling is usually used to construct a scoring model, wherein the clustering and modeling refer to that the overall sample (also referred to as a group) is divided according to the value of a grouping variable, and the grouping variable is usually selected according to expert experience or experiments. After multiple divisions, the entire group can be divided into many subgroups, and then a corresponding scoring model is constructed for each subgroup. However, the efficiency is usually low for selecting the grouping variable according to expert experience. When selecting a grouping variable according to experiments, various grouping possibilities usually need to be tried for clustering and modeling, and then the results are compared. The variable combinations increase exponentially as the number of variables increases. When the number of variables is high, it would be too difficult to try all possibilities. When it is impossible to try all possibilities, the selected group variable is usually inaccurate, which impacts the accuracy of the ultimately constructed scoring model.

SUMMARY

The present disclosure describes methods and devices for constructing a scoring model and evaluating user credit, which can improve the accuracy of the constructed scoring model.

A first aspect provides a method for constructing a scoring model, comprising: collecting a plurality of sample datasets each comprising at least one characteristic variable and a corresponding characteristic value; for each characteristic variable, acquiring an interaction index of the characteristic variable with each of one or more other characteristic variables, and determining a clustering index of the characteristic variable according to the interaction indices; selecting a target characteristic variable from the at least one characteristic variable according to the clustering indices of the characteristic variables; dividing the plurality of sample datasets into a plurality of sample dataset subgroups according to the target characteristic variable and the corresponding characteristic value; and constructing a corresponding sub-scoring model for each of the sample dataset subgroups.

A second aspect provides a method for evaluating user credit, comprising: acquiring credit data information of a user; determining, according to the credit data information, characteristic values respectively corresponding to a target characteristic variable and one or more other characteristic variables, wherein the target characteristic variable is selected according to clustering indices of a plurality of characteristic variables, and a plurality of sample datasets categorized in subgroups and comprise the plurality of characteristic variables and a corresponding characteristic value for each of the characteristic variables; selecting a corresponding sample dataset subgroup according to the characteristic value corresponding to the target characteristic variable; determining a credit score of the user according to a sub-scoring model corresponding to the sample dataset subgroup and characteristic values corresponding to the other characteristic variables; and evaluating the credit of the user according to the credit score of the user.

A third aspect provides a device for constructing a scoring model, comprising: a collecting unit configured to collect a plurality of sample datasets each comprising at least one characteristic variable and a corresponding characteristic value; an acquiring unit configured to acquire, for each characteristic variable, an interaction index of the characteristic variable with each of one or more other characteristic variables; a determining unit configured to determine, according to the interaction indices acquired by the acquiring unit, a clustering index of the characteristic variable; a selecting unit configured to select, according to the clustering indices of all characteristic variables determined by the determining unit, a target characteristic variable from the at least one characteristic variable; a dividing unit configured to divide, according to the target characteristic variable and the corresponding characteristic value selected by the selecting unit, the plurality of sample datasets into a plurality of sample dataset subgroups; and an constructing unit configured to construct a corresponding sub-scoring model for each of the sample dataset subgroups divided by the dividing unit.

A fourth aspect provides a device for evaluating user credit, comprising: an acquiring unit configured to acquire credit data information of a user; a determining unit configured to determine, according to the credit data information acquired by the acquiring unit, characteristic values respectively corresponding to a target characteristic variable and one or more other characteristic variables, wherein the target characteristic variable is selected according to clustering indices of all characteristic variables in the sample dataset, and the sample dataset comprises at least one characteristic variable and a corresponding characteristic value; a selecting unit configured to select, according to the characteristic value corresponding to the target characteristic variable determined by the determining unit, a corresponding sample dataset subgroup; the determining unit further configured to determine a credit score of the user according to a sub-scoring model corresponding to the sample dataset subgroup selected by the selecting unit and characteristic values corresponding to the other characteristic variables; and an evaluating unit configured to evaluate, according to the credit score of the user determined by the determining unit, the credit of the user.

A fifth aspect provides a device for constructing a scoring model, the device comprising a processor and a non-transitory computer-readable storage medium storing instructions that, when executed by the processor, cause the device to perform a method. The method may comprise: collecting a plurality of sample datasets each comprising at least one characteristic variable and a corresponding characteristic value; for each characteristic variable, acquiring an interaction index of the characteristic variable with each of one or more other characteristic variables, and determining a clustering index of the characteristic variable according to the interaction indices; selecting a target characteristic variable from the at least one characteristic variable according to the clustering indices of the characteristic variables; dividing the plurality of sample datasets into a plurality of sample dataset subgroups according to the target characteristic variable and the corresponding characteristic value; and constructing a corresponding sub-scoring model for each of the sample dataset subgroups.

A sixth aspect provides a device for evaluating user credit, the device comprising a processor and a non-transitory computer-readable storage medium storing instructions that, when executed by the processor, cause the device to perform a method. The method may comprise: acquiring credit data information of a user; determining, according to the credit data information, characteristic values respectively corresponding to a target characteristic variable and one or more other characteristic variables, wherein the target characteristic variable is selected according to clustering indices of a plurality of characteristic variables, and a plurality of sample datasets categorized in subgroups and comprise the plurality of characteristic variables and a corresponding characteristic value for each of the characteristic variables; selecting a corresponding sample dataset subgroup according to the characteristic value corresponding to the target characteristic variable; and determining a credit score of the user according to a sub-scoring model corresponding to the sample dataset subgroup and characteristic values corresponding to the other characteristic variables.

With the methods and devices for constructing a scoring model and evaluating user credit according to the present disclosure, sample data comprising a plurality of sample datasets can be collected. For each characteristic variable comprised in the each sample dataset, an interaction index of the characteristic variable with each of one or more other characteristic variables can be acquired. According to the interaction indices, a clustering index of each characteristic variable can be determined. According to the clustering indices of all characteristic variables, a target characteristic variable can be selected from the characteristic variables comprised in the sample dataset. According to the target characteristic variable and a corresponding characteristic value, a plurality of sample datasets can be divided into a plurality of sample dataset subgroups. A corresponding sub-scoring model can be constructed for each sample dataset subgroup. Thus, by calculating a clustering index of each characteristic variable, the present disclosure discloses automatically selection of a target characteristic variable for grouping, which can improve the efficiency and accuracy of target characteristic variable selection, and then further improve the accuracy of scoring model construction.

BRIEF DESCRIPTION OF THE DRAWINGS

To more clearly describe technical solutions in the embodiments of the present disclosure, the accompanying drawings to be used in the description of the embodiments will be described briefly as follows. Apparently, the accompanying drawings in the following description are merely some embodiments of the present disclosure. To a person skilled in the art, other drawings may be further obtained according to these drawings without inventive effort.

DETAILED DESCRIPTION

Embodiments of the present disclosure will be described below with reference to the accompanying drawings.

The methods and devices for constructing a scoring model according to embodiments of the present disclosure are applicable to a situation of clustering and modeling. The essence of clustering and modeling is to break a complex functional relationship down to a simple additive functional relationship. For example, a characteristic variable used for performing clustering is determined first, and then the sample data is clustered according to the characteristic variable and a corresponding characteristic value. After the clustering, a corresponding sub-scoring model is constructed for each subgroup. In one situation, the sub-scoring model may include a simple additive functional relationship, e.g., that can be described directly using a scoring card model. Therefore, the process of clustering and modeling involves the selection of the characteristic variable for clustering. The present disclosure will provide a detailed description of this part in the following embodiments.

Moreover, the scoring model constructed in the present disclosure can be applied to areas such as user credit evaluation and financial risk control.

Figure 1:
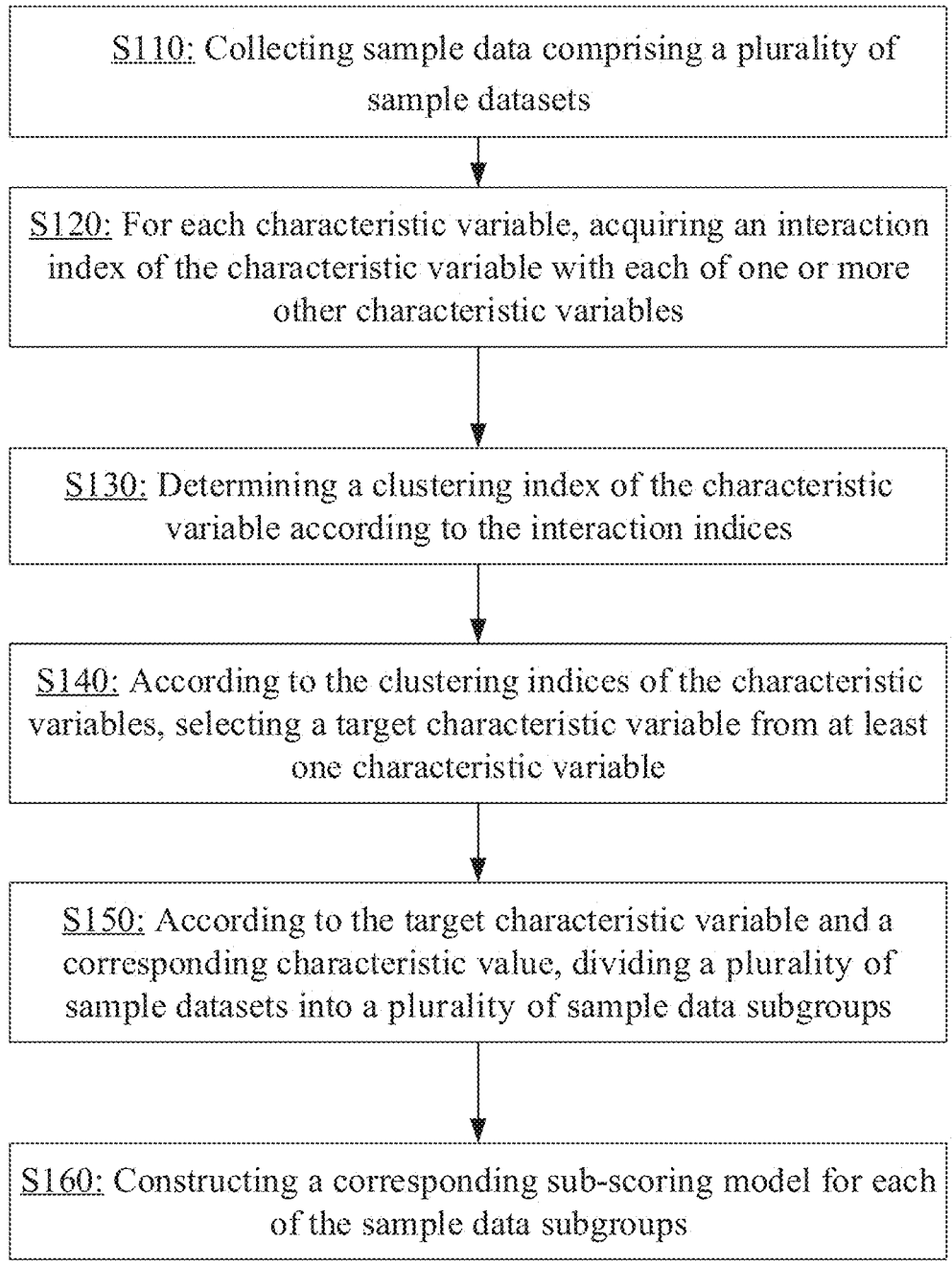
FIG. 1 is a flow chart of a method for constructing a scoring model according to an embodiment of the present disclosure.

FIG. 1 is a flow chart of a method for constructing a scoring model according to an embodiment of the present disclosure. The main body to execute the method may be a device with processing capabilities: a server, a system, or a device. As shown in FIG. 1, the method comprises:

Step 110, collecting sample data comprising a plurality of sample datasets.

The collected sample data may comprise a plurality of sample datasets each comprising at least one characteristic variable and a corresponding characteristic value.

In some embodiments, the above characteristic variable may be manually configured in advance. For example, when the above scoring model is applied to user credit evaluation, characteristic variables of the above sample datasets can be classified into the following three types: 1) user activity data ("A"); 2) user trend data ("T"); 3) user profile data ("P"). The user activity data may comprise: user transaction activity data, user financial management activity data, and other user activity data. Here, the user transaction activity data may comprise, for example: a. an average payment amount for a number of days (e.g., 90 days); b. the number of payment activity days within a number of days (e.g., 180 days); c. a payment amount within a number of days (e.g., 180 days); d. the time between the last payment and present. The user financial management activity data may comprise, for example: a. the number of times that a first target product is purchased within a number of days, e.g., the number of times that a financial service product provided by a financial service platform, such as Zhao Cai Bao™, is purchased within 90 days; b. the number of times that a second target product is purchased within a number of days, e.g., the number of times that a financial service product provided by a financial service platform, such as Yu E Bao™, is purchased within 90 days; c. the amount used to purchase a second target product within a number of days, e.g., the balance used to purchase Yu E Bao™ within 90 days. The other user activity data may comprise, for example: a. the number of calls from a user within a number of days (e.g., 180 days); b. the city in which the last logon happened; c. the time between the last logon and present; d. the number of logon actions within a number of days (e.g., 90 days). The user trend data may comprise, for example: a. a variation trend of user's average balance (30 days/30-90 days); b. a variation trend of the number of logon actions (30 days/30-60 days); c. a variation trend of Remote Procedure Call (RPC) (30 days/30-60 days); d. a variation trend of the number of payments (30 days/30-90 days). The user profile data may comprise, for example: a. whether the user is single; b. whether the user has done certain activities, such as renovation on its house; c. whether the user is married; d. the user's age; e. time since the user's registration; f. the user's education level; g. the user's income, etc.

In some embodiments, characteristic values corresponding to all characteristic variables in the sample datasets may be processed in advance, for example, by discretization. For example, assuming that the characteristic variable is a user's age, the user's age is discretized to obtain the following four segments (also referred to as sub-boxes): "<20", "[20, 25)", "[25, 30)", and ">=30".

Step 120, for each characteristic variable, acquiring an interaction index of the characteristic variable with each of one or more other characteristic variables.

Other characteristic variables herein refer to the remaining characteristic variables other than the characteristic variable in the each sample dataset, and there may be a plurality of the other characteristic variables. For example, assuming that the sample dataset includes three characteristic variables and corresponding characteristic values, and that these three characteristic variables are x1, x2, and x3 respectively. When the characteristic variable is x1, the other characteristic variables include x2 and x3.

Figure 2:
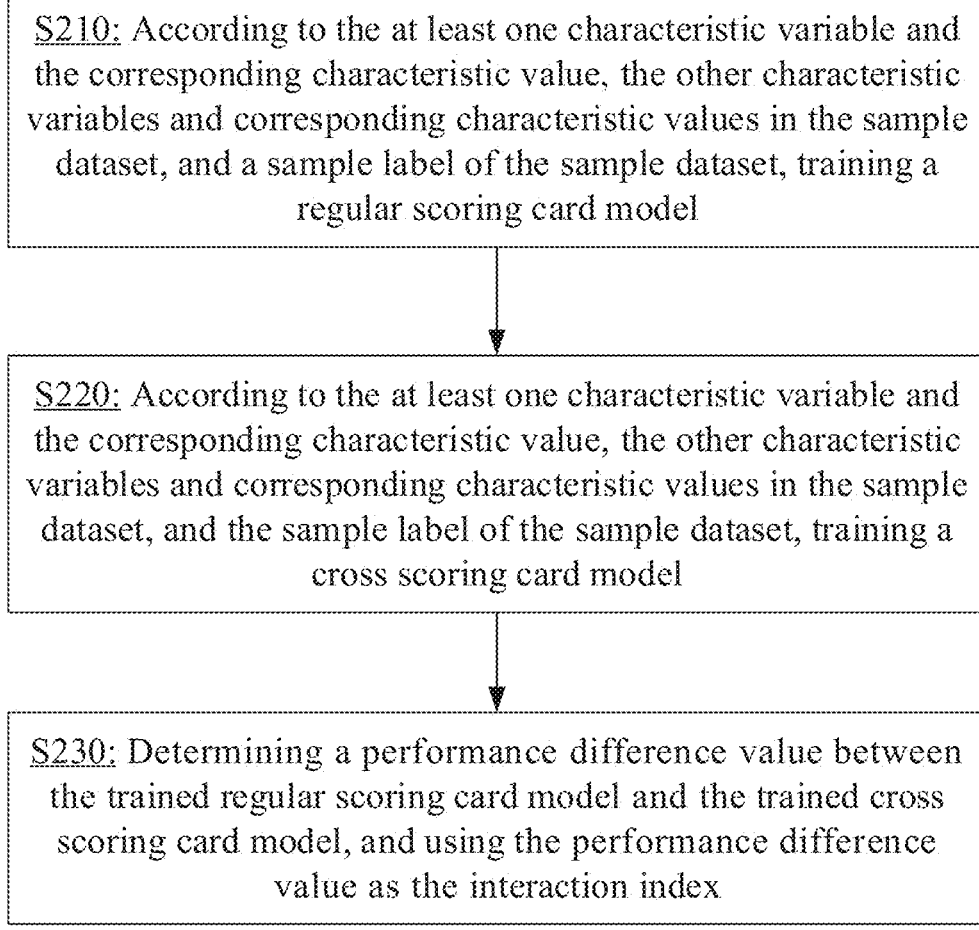
FIG. 2 is a flow chart of a method for acquiring an interaction index of a characteristic variable according to the present disclosure.

In one implementation, the process of acquiring an interaction index of the characteristic variable with other characteristic variables may be as shown in FIG. 2. The process may include the following steps:

Step 210, according to the at least one characteristic variable and the corresponding characteristic value, and other characteristic variables and corresponding characteristic values in the sample dataset, and a sample label of the sample dataset, training a regular scoring card model.

The process of training a regular scoring card model may comprise: pre-setting a regular scoring card model: $y=f1(x1)+f2(x2)$, wherein y may be defined as scoring result, x1 is a characteristic variable, and x2 is one other characteristic variable. The functional relationship $f1(x1)$ may be defined as a score value corresponding to various segments of the characteristic variable x1, and the functional relationship $f2(x2)$ may be defined as a score value corresponding to various segments of the other characteristic variable x2. Subsequently, the training of the regular scoring card model is achieved by optimizing the functional relationships f1 and f2. In some embodiments, optimizing the functional relationship f1 is a process of adjusting the score value corresponding to various segments of the characteristic variable x1, and optimizing the functional relationship f2 is a process of adjusting the score value corresponding to various segments of the other characteristic variable x2.

In one example, the functional relationships f1 and f2 can be optimized by learning the sample data in the plurality of sample datasets. For example, each sample dataset can be scored by a preset regular scoring card model. The present regular scoring card model comprises two functional relationships (f1 and f2), f1 is related to x1, and f2 is related to x2. Therefore, the process of scoring sample data through the preset regular scoring card model can comprise: obtaining a first scoring result through f1(x1), and obtaining a second scoring result through f2(x2). Here, the process of obtaining a first scoring result is a process of selecting, according to a characteristic value of the characteristic variable x1 comprised in the current sample dataset, from f1, a score value that corresponds to a segment to which the characteristic value belongs. The process of obtaining a second scoring result is a process of selecting, according to a characteristic value of one other characteristic variable x2 comprised in the current sample dataset, from f2, a score value that corresponds to a segment to which the characteristic value belongs. Subsequently, an ultimate scoring result is obtained by adding the first scoring result and the second scoring result. When the ultimate scoring result is obtained, f1 and f2 are adjusted by comparing the ultimate scoring result with the sample label (e.g., a labelled scoring result y' and the labelling may be performed manually or otherwise predetermined) of the sample dataset, thereby obtaining optimized f1 and f2. In one implementation, when the accuracy of scoring result of each sample dataset by the preset regular scoring card model reaches a preset threshold value, the preset regular scoring card model has been trained.

In an example, a trained regular scoring card model is shown in Table 1.

TABLE 1

| # | Characteristic variable | Segment | Score |
|---|---|---|---|
| 1 | User's age | <20 | 20 |
|   |   | [20, 25) | 27 |
|   |   | [20, 30) | 30 |
|   |   | >=30 | 35 |
| 2 | User's education level | Associate or below | 27 |
|   |   | Bachelor | 37 |
|   |   | Master | 41 |
|   |   | Ph.D. or above | 42 |
| 3 | User's income | <5000 | 30 |
|   |   | [5000, 10000) | 37 |
|   |   | [10000, 20000) | 38 |
|   |   | >=20000 | 42 |

In some embodiments, when a regular scoring card model is configured in the step 210, it is assumed that f1 is related to a characteristic variable (x1), and f2 is related to a characteristic variable (x2). Namely, f1 and f2 are both univariate functions, that is, the above regular scoring card model may not consider interactions between characteristic variables.

In some embodiments, f1 is only related to a characteristic variable x1, and f2 is only related to a characteristic variable x2. As a result, it does not require a large number of sample datasets in the process of adjusting f1 and f2. Since there is no need for a large number of sample datasets, a regular scoring card model can be trained rapidly.

Step 220, according to the at least one characteristic variable and the corresponding characteristic value, and other characteristic variables and corresponding characteristic values in the sample dataset, and a sample label of the sample dataset, training a cross scoring card model.

A process of training a cross scoring card model may comprise: pre-setting a cross scoring card model: y=f(x1, x2), wherein y may be defined as a scoring result, x1 is a characteristic variable, and x2 is one other characteristic variable. The functional relationship f(x1, x2) may be defined as a score value corresponding to a cross segment (also referred to as binary cross segment) of the characteristic variable x1 with one other characteristic variable x2. Subsequently, the training of the regular scoring card model is achieved by optimizing the functional relationship f. In some embodiments, optimizing the functional relationship f is a process of adjusting the score value corresponding to a cross segment of the characteristic variable x1 with one other characteristic variable x2.

The process of optimizing the functional relationship f is similar to the process of optimizing f1, which will not be repeated herein.

Cross segments will be described below through an example, where it is assumed that the characteristic variable is "user's age", and four segments of the user's age are "<20", "[20, 25)", "[25, 30)" and ">=30". Assuming that the one other characteristic variable is user's education level, and four segments of the user's education level are "associate or below", "bachelor", "master", and "Ph.D. or above", the characteristic variable and the other characteristic variable can form 4*4=16 cross segments, of which one cross segment may be, for example, "<20 & associate and below".

In some embodiments, when a cross scoring card model is configured in the step 220, it is assumed that y is related simultaneously to two independent characteristic variables (x1 and x2). Namely, f(x1, x2) is a binary function, that is, the above cross scoring card model considers interaction between characteristic variables. Therefore, interaction between characteristic variables can be well described through the cross scoring card model.

Step 230, determining a performance difference value between the trained regular scoring card model and the trained cross scoring card model, and using the performance difference value as the interaction index.

In one example, before determining the above performance difference value, a performance index value obj{f1(x1)+f2(x2)} of the trained regular scoring card model and a performance index value obj{f(x1, x2)} of the trained cross scoring card model can be determined first. Here, the process of determining a performance index value of the trained regular scoring card model may comprise: scoring sample datasets (e.g., all sample datasets in the collected sample data) through the trained regular scoring card model; according to the sample datasets scoring results by the trained regular scoring card model and the sample label, determining a performance index value of the trained regular scoring card model.

The process of determining a performance index value of the trained regular scoring card model may comprise: scoring each sample dataset with the trained regular scoring card model to obtain a scoring result for each sample dataset; according to the scoring result of each sample dataset and a sample label of each sample dataset, determining an error of each sample dataset; according to the errors of all sample dataset, determining a performance index value of the trained regular scoring card model.

The process of determining a performance index value obj{f(x1, x2)} of the trained cross scoring card model may comprise: scoring each sample dataset with the trained cross scoring card model; according to the scoring result by the trained cross scoring card model and a sample label of each sample dataset, determining a performance index value of the trained cross scoring card model.

The above methods for determining performance indices for the regular scoring card model and the cross scoring card model are merely exemplary. In fact, there are other methods for evaluating model performance, which will not be repeated one by one.

After a performance index value of the trained regular scoring card model and a performance index value of the trained cross scoring card model are determined, subtraction may be performed on the two values to determine a performance difference value I(x1, x2) between the trained regular scoring card model and the trained cross scoring card model. Namely, I(x1, x2)=obj{f(x1, x2)}−obj{f1(x1)+f2(x2)}. In some embodiments, the performance difference value I(x1, x2) is used to describe performance difference between the trained regular scoring card model and the trained cross scoring card model.

In some embodiments, since a cross scoring card model considers interaction between characteristic variables, interactions between characteristic variables can be well described through the cross scoring card model. But, a regular scoring card model usually does not describe interactions between characteristic variables. Therefore, the performance difference value can be used as an interaction index between characteristic variables. For example, when the interaction index is relatively small (e.g., close to 0), it indicates that the interaction between the two characteristic variables is relatively weak. On the contrary, when the interaction index is relatively high, it indicates that the interaction between the two characteristic variables is relatively strong.

Step 130, determining a clustering index of the characteristic variable according to the interaction indices.

In some embodiments, when there is a plurality of other characteristic variables, a plurality of interaction indices are obtained, wherein the method for obtaining each of the interaction indices is similar, as shown in FIG. 2, and will not be repeated here.

For example, assuming that the sample dataset includes three characteristic variables and corresponding characteristic values, and that these three characteristic variables are x1, x2, and x3 respectively. When the characteristic variable is x1, other characteristic variables include x2 and x3. Correspondingly, there are two interaction indices to be calculated: I(x1, x2) and I(x1, x3). In one implementation, after a plurality of interaction indices are determined, the plurality of interaction indices can be added up, and the addition result is used as a clustering index of the characteristic variable x1. Namely, the equation 1 can be used to determine a clustering index of a characteristic variable.

$$Agg(xi)=\text{sum}(I(xi,xj))j=1,\ldots,N\ j\neq i \quad \text{(equation 1)}$$

Here, xi is a characteristic variable of which the clustering index needs to be determined currently, which has a value range of [1, N], Agg(xi) is the clustering index of the characteristic variable xi, N is the number of characteristic variables, xj are the other N−1 characteristic variables that are different from the characteristic variable xi.

In some embodiments, N clustering indices can be determined when there are N characteristic variables, which are represented by Agg(x1), Agg(x2), ..., Agg(xN) respectively.

Step 140, according to the clustering indices of the (e.g., all) characteristic variables, selecting a target characteristic variable from at least one characteristic variable.

In one implementation, the clustering indices of all characteristic variables can be compared, and the characteristic variable corresponding to the maximum clustering index is selected as the target characteristic variable. In some embodiments, a clustering index of a characteristic variable is a sum of interaction indices of the characteristic variable and other characteristic variables, while an interaction index is used to describe the strength of an interaction with the characteristic variable. Thus, when a characteristic variable has the maximum clustering index, it shows that the characteristic variable has a relatively strong interaction with all other characteristic variables. That is, a characteristic variable that has a relatively strong interaction with all other characteristic variables can be selected as the target characteristic variable.

Step 150, according to the target characteristic variable and a corresponding characteristic value, dividing a plurality of sample datasets into a plurality of sample dataset subgroups.

Here, the process of dividing sample datasets into subgroups may also be referred to as a clustering process. It may be a conventional technology to cluster sample datasets according to a characteristic variable and a corresponding characteristic value in clustering and modeling, which will not be repeated herein.

In some embodiments, as mentioned above, a target characteristic variable may refer to a characteristic variable with a relatively strong interaction with all other characteristic variables. Therefore, the clustering of the sample datasets according to the target characteristic variable and a corresponding characteristic value can reduce interactions within a cluster, to achieve the goal of the most ideal clustering and modeling.

Step 160, constructing a corresponding sub-scoring model for each of the sample dataset subgroups.

For example, after all sample dataset subgroups are obtained, a regular scoring card model can be trained for each sample dataset subgroup, which is shown in Table 1.

Figure 3:
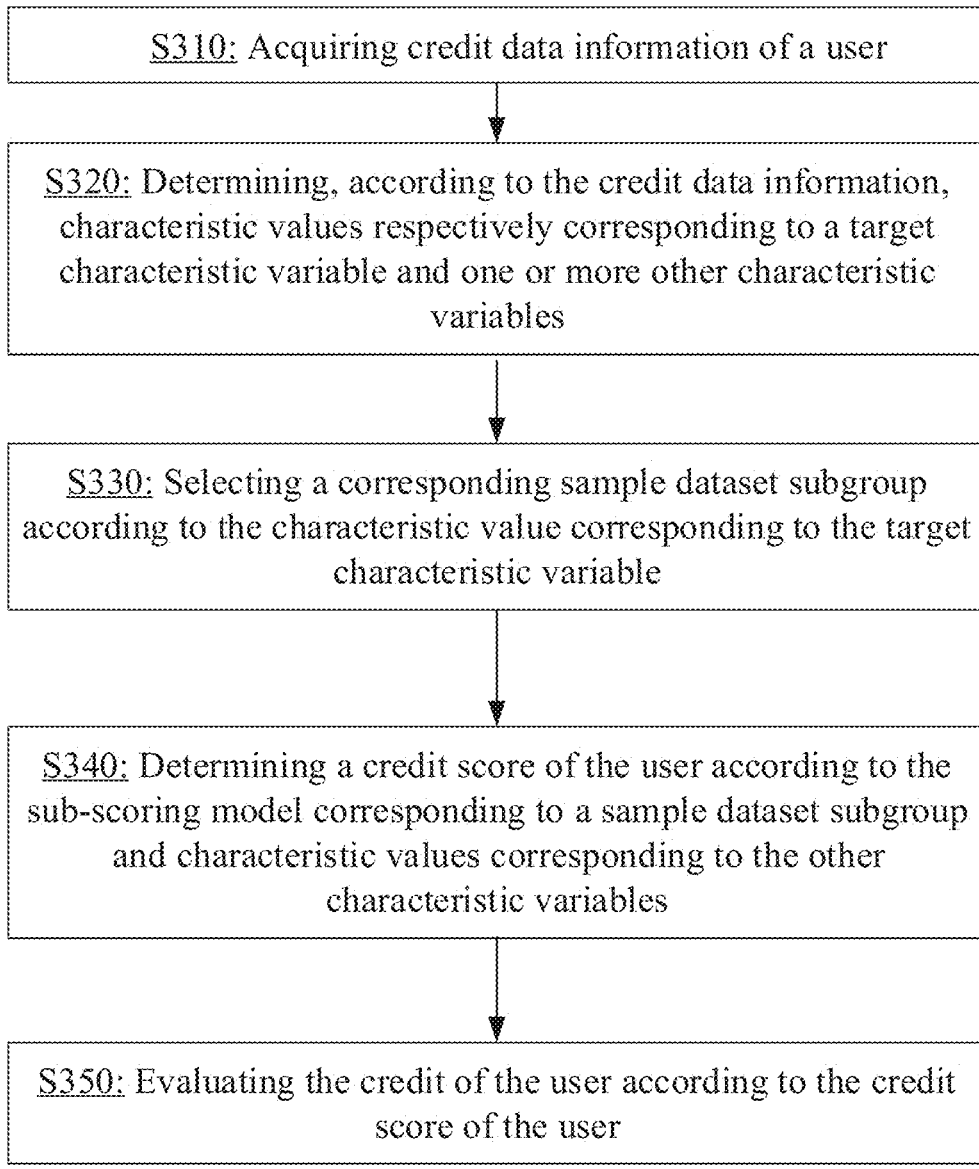
FIG. 3 is a flow chart of a method for evaluating user credit according to an embodiment of the present disclosure.

In some embodiments, after a scoring model is constructed, the user credit can be evaluated or the transaction activity risk can be estimated based on the scoring model. With the user credit evaluation based on the scoring model as an example, the evaluation method may be as shown in FIG. 3. As shown in FIG. 3, the method may comprise the following steps:

Step 310, acquiring credit data information of a user.

Here, the credit data information of a user may be collected from a backend database manually or by a server, which can include, but is not limited to, data in the following three aspects: 1) user activity data; 2) user trend data; 3) user profile data.

Step 320, determining, according to the credit data information, characteristic values respectively corresponding to a target characteristic variable and one or more other characteristic variables. In some embodiments, the target characteristic variable is selected according to clustering indices of a plurality of characteristic variables, and a plurality of sample datasets categorized in subgroups and comprise the plurality of characteristic variables and a corresponding characteristic value for each of the characteristic variables.

The target characteristic variable herein refers to the target characteristic variable selected through the above step 120-step 140. The selection process thereof is the same as described above, which will not be repeated herein.

In an example that the credit data information comprises a user's age of 20 years old, a user's education level of bachelor, and a user's income of 0, assuming that the target characteristic variable is the user's age, and the other characteristic variables include the user's education level and the user's income. The characteristic value corresponding to the target characteristic variable is 20 years old, and the characteristic values corresponding to the other target characteristic variables are bachelor and 0, respectively.

Step 330, selecting a corresponding sample dataset subgroup according to the characteristic value corresponding to the target characteristic variable.

For example, assuming that the target characteristic variable is the user's age, and the sample data comprising the plurality of sample datasets is divided into four sample dataset subgroups (e.g., divided into four clusters) according to the characteristic value corresponding to the target characteristic variable, wherein the age of users in the first sample dataset subgroup is younger than 20 years old, the age of users in the second sample dataset subgroup is between 20 and 25 years old, the age of users in the third sample dataset subgroup is between 25 and 30 years old, and the age of users in the fourth sample dataset subgroup is older than 30 years old. According to the credit data information of the user, the characteristic value determined corresponding to the target characteristic variable is the second sample dataset subgroup selected for 20 years old.

Step 340, determining a credit score of the user according to the sub-scoring model corresponding to a sample dataset subgroup and characteristic values corresponding to the other characteristic variables.

As in the example above, it is assumed that the selected sub-scoring model corresponding to the second sample dataset subgroup is as shown in Table 2.

TABLE 2

| # | Characteristic variable | Segment | Score |
|---|---|---|---|
| 1 | User's education level | Associate or below | 27 |
|   |   | Bachelor | 37 |
|   |   | Master | 41 |
|   |   | Ph.D. or above | 42 |
| 2 | User's income | <5000 | 30 |
|   |   | [5000, 10000) | 37 |
|   |   | [10000, 20000) | 38 |
|   |   | >=20000 | 42 |

For example, when the sub-scoring model corresponding to the second sample dataset subgroup is as shown in Table 2, the characteristic values corresponding to two other characteristic variables are Bachelor and 0, and then the user's credit score=37+30=67.

Step 350, evaluating the credit of the user according to the credit score of the user.

In one implementation, a threshold can be configured. When the credit score of a user exceeds the preset threshold, it shows that the user has a relatively high credit. When the credit score of a user does not exceed the preset threshold, it shows that the user has a relatively low credit.

The method for evaluating user credit according to embodiments of the present disclosure can accurately evaluate a user's credit and can improve the evaluation efficiency.

Figure 4:
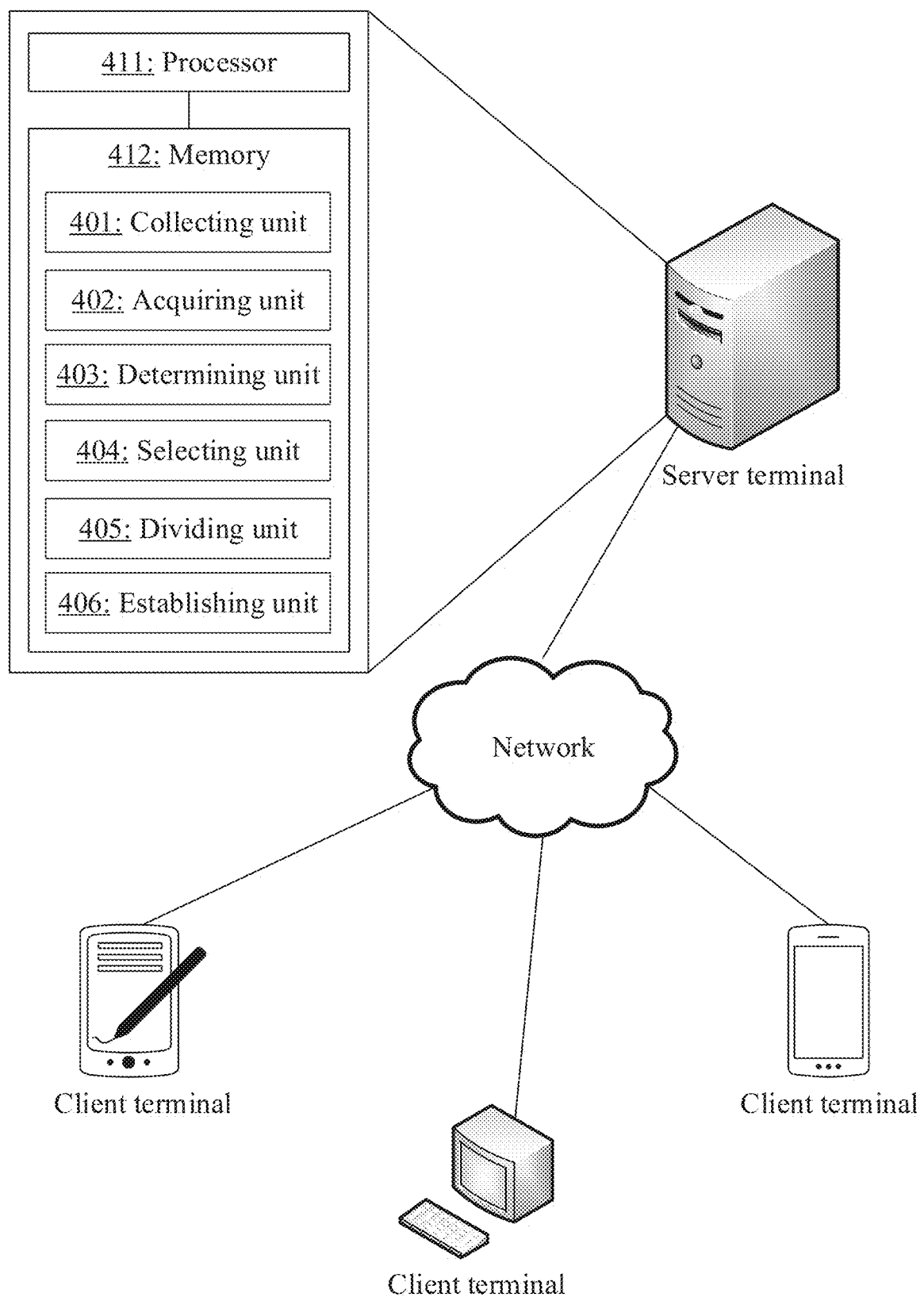
FIG. 4 is a schematic diagram of a device for constructing a scoring model according to an embodiment of the present disclosure.

Corresponding to the above method for constructing a scoring model, embodiments of the present disclosure further provide a device (e.g., a server terminal) for constructing a scoring model as shown in FIG. 4, and the device may comprise a processor 411 and a memory 412 coupled together. The memory 412 may be non-transitory and computer-readable and store instructions that, when executed by the processor 411, cause the device to perform various steps and methods described herein. The instructions may be implemented as various units described below. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

In some embodiments, such units may comprise a collecting unit 401 configured to collect a plurality of sample datasets each comprising at least one characteristic variable and a corresponding characteristic value; and an acquiring unit 402 configured to acquire, for each characteristic variable, an interaction index of the characteristic variable with other characteristic variables.

Optionally, the acquiring unit 402 may be configured to: train a regular scoring card model according to the characteristic variable and the corresponding characteristic value, and other characteristic variables and corresponding characteristic values in the sample dataset, and a sample label of the sample dataset; train a cross scoring card model according to the characteristic variable and the corresponding characteristic value, and other characteristic variables and corresponding characteristic values in the sample dataset, and a sample label of the sample dataset; and determine a performance difference value between the trained regular scoring card model and the trained cross scoring card model, and use the performance difference value as the interaction index.

Here, the determining a performance difference value between the trained regular scoring card model and the trained cross scoring card model may comprise: scoring the sample dataset with the trained regular scoring card model; according to the sample dataset scoring results by the trained regular scoring card model and the sample label, determining a performance index value of the trained regular scoring card model; scoring the sample dataset with the trained cross scoring card model; according to the sample dataset scoring results by the trained cross scoring card model and the sample label, determining a performance index value of the trained cross scoring card model; and determining the performance difference value according to the performance index value of the trained regular scoring card model and the performance index value of the trained cross scoring card model.

The various units may further comprise a determining unit 403 configured to determine, according to the interaction indices acquired by the acquiring unit 402, a clustering index of the characteristic variable.

Optionally, when there is a plurality of the interaction indices, the determining unit 403 can be configured to: perform an addition operation on the plurality of the interaction indices to obtain a summing result; and use the addition result as a clustering index of the characteristic variable.

The various units may further comprise a selecting unit 404 configured to select, according to the clustering indices of all characteristic variables determined by the determining unit 403, a target characteristic variable from the at least one characteristic variable.

Optionally, the selecting unit 404 can be specifically configured to: compare the clustering indices of all characteristic variables, and select the characteristic variable corresponding to the maximum clustering index as the target characteristic variable.

The various units may further comprise a dividing unit 405 configured to divide, according to the target characteristic variable and the corresponding characteristic value selected by the selecting unit 404, the plurality of sample datasets into a plurality of sample dataset subgroups.

The various units may further comprise an constructing unit 406 configured to construct a corresponding sub-scoring model for each sample dataset subgroup divided by the dividing unit 405.

The functions of the functional modules (e.g., units) of the device according to the embodiments of the present disclosure can be implemented through the steps of the above method embodiments. Therefore, the specific working process of the device according to the present disclosure will not be repeated herein.

With the device for constructing a scoring model according to some embodiments of the present disclosure, the collecting unit 401 collects sample data comprising a plurality of sample datasets. For each characteristic variable, the acquiring unit 402 acquires an interaction index of the characteristic variable with other characteristic variables. The determining unit 403 determines, according to the interaction indices, a clustering index of the characteristic variable. The selecting unit 404 selects, according to the clustering indices of all characteristic variables, a target characteristic variable from at least one characteristic variable. The dividing unit 405 divides, according to the target characteristic variable and the corresponding characteristic value, the plurality of sample datasets into a plurality of sample dataset subgroups. For each sample dataset subgroup, the constructing unit 406 constructs a corresponding sub-scoring model. Therefore, the accuracy of scoring model construction can be improved.

According to one aspect of the present disclosure, as shown in FIG. 4, the units 401-406 are software functional units including instructions stored in the memory. According to another aspect, the units 401-406 may be implemented by hardware, e.g., circuitry programmed to perform the functionalities as described above.

Figure 5:
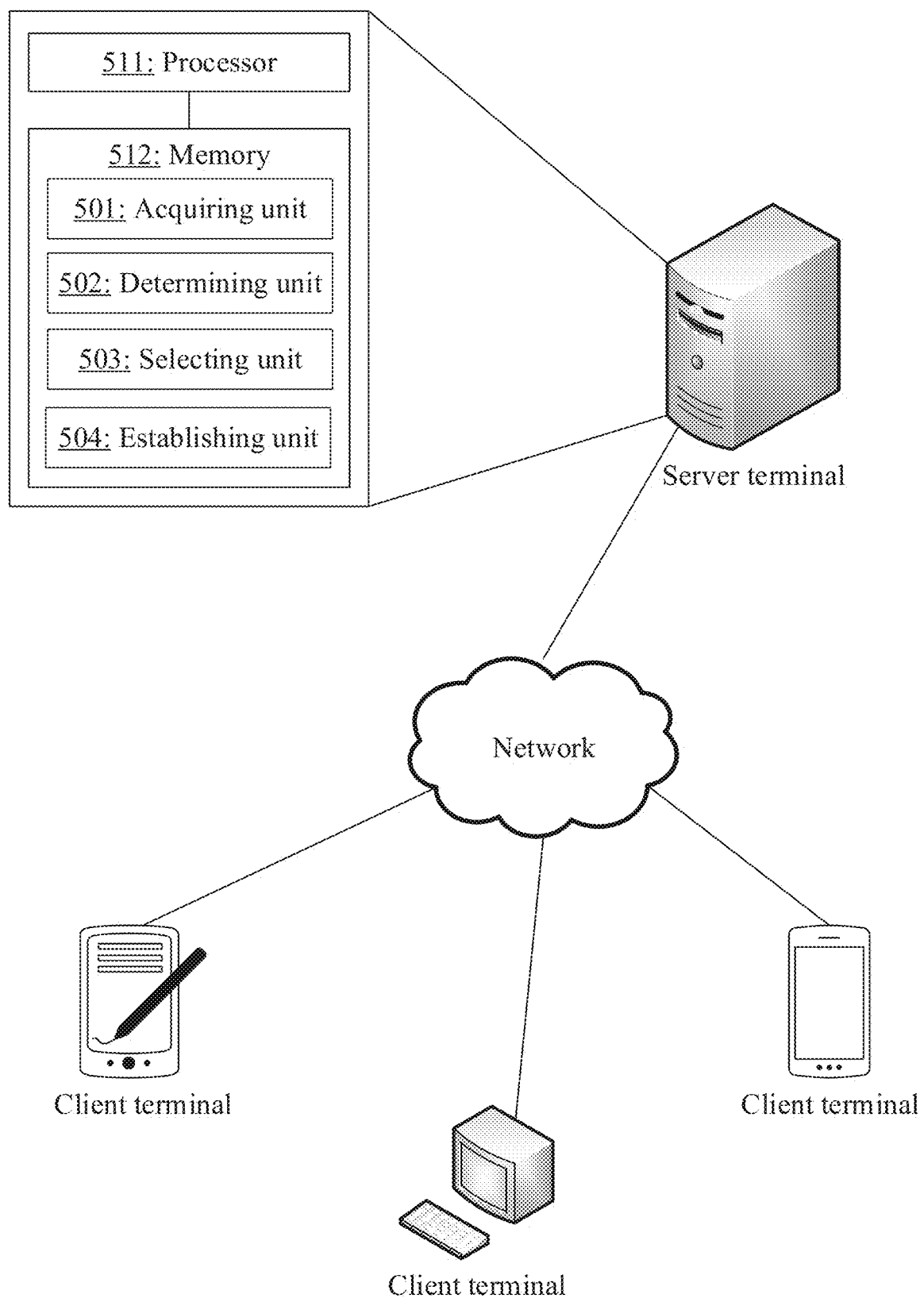
FIG. 5 is a schematic diagram of a device for evaluating user credit according to an embodiment of the present disclosure.

Corresponding to the above-described method for evaluating user credit, embodiments of the present disclosure further provide a device (e.g., a server terminal) for evaluating user credit as shown in FIG. 5, and the device may comprise a processor 511 and a memory 512 coupled together. The memory 512 may be non-transitory and computer-readable and store instructions that, when executed by the processor 511, cause the device to perform various steps and methods described herein. The instructions may be implemented as various units described below.

In some embodiments, such units may comprise: an acquiring unit 501 configured to acquire credit data information of a user; a determining unit 502 configured to determine, according to the credit data information acquired by the acquiring unit 501, characteristic values corresponding to a target characteristic variable and other characteristic variables, wherein the target characteristic variable is selected according to the clustering indices of all characteristic variables in the sample dataset, and the sample dataset comprises at least one characteristic variable and a corresponding characteristic value; and a selecting unit 503 configured to select, according to the characteristic value corresponding to the target characteristic variable determined by the determining unit 502, a corresponding sample dataset subgroup.

In some embodiments, the determining unit 502 may be further configured to determine a credit score of the user according to the sub-scoring model corresponding to the sample dataset subgroup selected by the selecting unit 503 and characteristic values corresponding to the other characteristic variables.

In some embodiments, the various units may further comprise an evaluating unit 504 configured to evaluate, according to the credit score of the user determined by the determining unit 502, the credit of the user.

Optionally, the selecting unit 503 is further configured to: acquire, for each characteristic variable in the sample dataset, an interaction index of the characteristic variable with other characteristic variables; determine, according to the interaction indices, a clustering index of the characteristic variable; and select, according to the clustering indices of all the characteristic variables, the target characteristic variable from at least one characteristic variable.

Optionally, the above acquiring an interaction index of the characteristic variable with other characteristic variables can comprise: training a regular scoring card model according to the characteristic variable and the corresponding characteristic value, and other characteristic variables and corresponding characteristic values in the sample dataset, and a sample label of the sample dataset; training a cross scoring card model according to the characteristic variable and the corresponding characteristic value, and other characteristic variables and corresponding characteristic values in the sample dataset, and a sample label of the sample dataset; and determining a performance difference value between the trained regular scoring card model and the trained cross scoring card model, and using the performance difference value as the interaction index.

Optionally, the above determining a performance difference value between the trained regular scoring card model and the trained cross scoring card model comprises: scoring the sample dataset with the trained regular scoring card model; according to the sample dataset scoring results by the trained regular scoring card model and the sample label, determining a performance index value of the trained regular scoring card model; scoring the sample dataset with the trained cross scoring card model; according to the sample dataset scoring results by the trained cross scoring card model and the sample label, determining a performance index value of the trained cross scoring card model; determining the performance difference value according to the performance index value of the trained regular scoring card model and the performance index value of the trained cross scoring card model.

The functions of functional modules of the device according to the embodiments of the present disclosure can be implemented through the steps of the above method embodiments. Therefore, the specific working process of the device according to the present disclosure will not be repeated herein.

According to one aspect of the present disclosure, as shown in FIG. 5, the units 501-504 are software functional units including instructions stored in the memory. According to another aspect, the units 501-504 may be implemented by hardware, e.g., circuitry programmed to perform the functionalities as described above.

The device for evaluating user credit according to the embodiments of the present disclosure can accurately evaluate user credit.

A person skilled in the art should be aware that the functions described by the present disclosure in the above one or more examples can be implemented through hardware, software, firmware or any combination thereof. When implemented through software, these functions can be stored in a computer readable medium or transmitted as one or more instructions or codes on a computer readable medium.

The implementation described above further describes in detail the objects, technical solutions and beneficial effects of the present disclosure. It should be understood that the description above is merely exemplary and is not used to limit the scope of the present disclosure. Any modification, equivalent substitution or improvement made on the basis of the technical solutions of the present application shall be encompassed by the scope of the present disclosure.

The invention claimed is:

1. A method comprising:
   collecting a plurality of sample datasets comprising multiple characteristic variables, each of the sample datasets comprising at least one of the characteristic variables and a corresponding characteristic value;
   for each of the multiple characteristic variables, acquiring an interaction index indicating an interaction of the characteristic variable with each of one or more of the other characteristic variables of the multiple characteristic variables by performing operations comprising:
      training a regular scoring card model according to the characteristic variable and its corresponding characteristic value in the sample datasets, the other characteristic variables and their corresponding characteristic values in the sample datasets, and a sample label of the sample datasets, wherein the regular scoring card model does not consider interactions between the characteristic variables;
      training a cross scoring card model according to the characteristic variable and its corresponding characteristic value, the other characteristic variables and their corresponding characteristic values in the sample datasets, and the sample label of the sample datasets, wherein the cross scoring card model considers interactions between the characteristic variables; and
      determining a performance difference value between the trained regular scoring card model and the trained cross scoring card model, and using the performance difference value as the interaction index;
   for each of the multiple characteristic variables, determining a clustering index of the characteristic variable according to the interaction indices, each of the clustering indices indicating a relative strength of interaction between the characteristic variable and the other characteristic variables;
   selecting, according to the clustering indices of the multiple characteristic variables, a target characteristic variable from the characteristic variables that has the highest relative strength of interaction with the other characteristic variables;
   dividing the plurality of sample datasets into a plurality of sample dataset subgroups according to the target characteristic variable and its corresponding characteristic value; and
   constructing a corresponding sub-scoring model for each of the sample dataset subgroups.

2. The method according to claim 1, wherein determining the performance difference value between the trained regular scoring card model and the trained cross scoring card model comprises:
  scoring the sample dataset with the trained regular scoring card model;
  according to sample dataset scoring results scored by the trained regular scoring card model and to the sample label, determining a performance index value of the trained regular scoring card model;
  scoring the sample dataset with the trained cross scoring card model;
  according to sample dataset scoring results scored by the trained cross scoring card model and to the sample label, determining a performance index value of the trained cross scoring card model; and
  determining the performance difference value according to the performance index value of the trained regular scoring card model and the performance index value of the trained cross scoring card model.

3. The method according to claim 1, wherein determining the clustering index of the characteristic variable according to the interaction indices comprises:
  performing an addition operation on the plurality of the interaction indices to obtain a summing result; and
  using the summing result as the clustering index of the characteristic variable.

4. The method according to claim 1, wherein selecting the target characteristic variable comprises:
  comparing the clustering indices of the characteristic variables, and selecting one of the characteristic variables corresponding to the maximum clustering index as the target characteristic variable.

5. A method, comprising:
  obtaining a sample dataset comprising multiple characteristic variables and first characteristic values corresponding to the multiple characteristic variables;
  for each of the multiple characteristic variables, acquiring an interaction index indicating an interaction of the characteristic variable with each of one or more of the other characteristic variables of the multiple characteristic variables by performing operations comprising:
    training a regular scoring card model according to the characteristic variable and its corresponding first characteristic value in the sample dataset, the other characteristic variables and their corresponding first characteristic values in the sample dataset, and a sample label of the sample dataset, wherein the regular scoring card model does not consider interactions between the characteristic variables;
    training a cross scoring card model according to the characteristic variable and its corresponding first characteristic value, the other characteristic variables and their corresponding first characteristic values in the sample dataset, and the sample label of the sample dataset, wherein the cross scoring card model considers interactions between the characteristic variables; and
    determining a performance difference value between the trained regular scoring card model and the trained cross scoring card model, and using the performance difference value as the interaction index;
  for each of the multiple characteristic variables, determining a clustering index of the characteristic variable according to the interaction indices, each of the clustering indices indicating a relative strength of interaction between the characteristic variable and the other characteristic variables;
  selecting, according to the clustering indices of the characteristic variables, a target characteristic variable from the characteristic variables that has the highest relative strength of interaction with the other characteristic variables;
  dividing the sample dataset into multiple sample dataset subgroups according to the target characteristic variable and its corresponding first characteristic value;
  acquiring credit data of a user;
  determining, according to the credit data, second characteristic values respectively corresponding to the target characteristic variable and the other characteristic variables;
  selecting a corresponding sample dataset subgroup from the sample dataset subgroups according to the second characteristic value corresponding to the target characteristic variable; and
  determining a credit score of the user according to a sub-scoring model corresponding to the sample dataset subgroup and the second characteristic values corresponding to the other characteristic variables.

6. The method according to claim 5, wherein determining the performance difference value between the trained regular scoring card model and the trained cross scoring card model comprises:
  scoring the sample dataset with the trained regular scoring card model;
  according to sample dataset scoring results scored by the trained regular scoring card model and to the sample label, determining a performance index value of the trained regular scoring card model;
  scoring the sample dataset with the trained cross scoring card model;
  according to sample dataset scoring results scored by the trained cross scoring card model and to the sample label, determining a performance index value of the trained cross scoring card model; and
  determining the performance difference value according to the performance index value of the trained regular scoring card model and the performance index value of the trained cross scoring card model.

7. A device comprising a processor and a non-transitory computer-readable storage medium storing instructions that, when executed by the processor, cause the device to perform a method, the method comprising:
  collecting a plurality of sample datasets comprising multiple characteristic variables, each of the sample datasets comprising at least one of the characteristic variables and a corresponding characteristic value;
  for each of the multiple characteristic variables, acquiring an interaction index indicating an interaction of the characteristic variable with each of one or more of the other characteristic variables of the multiple characteristic variables by performing operations comprising:
    training a regular scoring card model according to the characteristic variable and its corresponding characteristic value in the sample datasets, the other characteristic variables and their corresponding characteristic values in the sample datasets, and a sample label of the sample datasets, wherein the regular scoring card model does not consider interactions between the characteristic variables;
    training a cross scoring card model according to the characteristic variable and its corresponding characteristic value, the other characteristic variables and their corresponding characteristic values in the sample datasets, and the sample label of the sample datasets, wherein the cross scoring card model considers interactions between the characteristic variables; and determining a performance difference value between the trained regular scoring card model and the trained cross scoring card model, and using the performance difference value as the interaction index;

for each of the multiple characteristic variables, determining a clustering index of the characteristic variable according to the interaction indices, each of the clustering indices indicating a relative strength of interaction between the characteristic variable and the other characteristic variables;

selecting, according to the clustering indices of the characteristic variables, a target characteristic variable from the characteristic variables that has the highest relative strength of interaction with the other characteristic variables;

dividing the plurality of sample datasets into a plurality of sample dataset subgroups according to the target characteristic variable and its corresponding characteristic value; and constructing a corresponding sub-scoring model for each of the sample dataset subgroups.

8. The device according to claim 7, wherein determining the performance difference value between the trained regular scoring card model and the trained cross scoring card model comprises:

scoring the sample dataset with the trained regular scoring card model;

according to sample dataset scoring results scored by the trained regular scoring card model and to the sample label, determining a performance index value of the trained regular scoring card model;

scoring the sample dataset with the trained cross scoring card model;

according to sample dataset scoring results scored by the trained cross scoring card model and to the sample label, determining a performance index value of the trained cross scoring card model; and determining the performance difference value according to the performance index value of the trained regular scoring card model and the performance index value of the trained cross scoring card model.

9. The device according to claim 7, wherein determining the clustering index of the characteristic variable according to the interaction indices comprises:

performing an addition operation on the plurality of the interaction indices to obtain a summing result; and using the summing result as the clustering index of the characteristic variable.

10. The device according to claim 7, wherein selecting the target characteristic variable comprises:

comparing the clustering indices of the characteristic variables, and selecting one of the characteristic variables corresponding to the maximum clustering index as the target characteristic variable.

11. A device comprising a processor and a non-transitory computer-readable storage medium storing instructions that, when executed by the processor, cause the device to perform a method, the method comprising:

obtaining a sample dataset comprising multiple characteristic variables and first characteristic values corresponding to the multiple characteristic variables;

for each of the multiple characteristic variables, acquiring an interaction index indicating an interaction of the characteristic variable with each of one or more of the other characteristic variables of the multiple characteristic variables by performing operations comprising:

training a regular scoring card model according to the characteristic variable and its corresponding first characteristic value in the sample dataset, the other characteristic variables and their corresponding first characteristic values in the sample dataset, and a sample label of the sample dataset, wherein the regular scoring card model does not consider interactions between the characteristic variables;

training a cross scoring card model according to the characteristic variable and its corresponding first characteristic value, the other characteristic variables and their corresponding first characteristic values in the sample dataset, and the sample label of the sample dataset, wherein the cross scoring card model considers interactions between the characteristic variables; and determining a performance difference value between the trained regular scoring card model and the trained cross scoring card model, and using the performance difference value as the interaction index;

for each of the multiple characteristic variables, determining a clustering index of the characteristic variable according to the interaction indices, each of the clustering indices indicating a relative strength of interaction between the characteristic variable and the other characteristic variables;

selecting, according to the clustering indices of the characteristic variables, a target characteristic variable from the characteristic variables that has the highest relative strength of interaction with the other characteristic variables;

dividing the sample dataset into multiple sample dataset subgroups according to the target characteristic variable and its corresponding first characteristic value;

acquiring credit data of a user;

determining, according to the credit data, second characteristic values respectively corresponding to the target characteristic variable and the other characteristic variables;

selecting a corresponding sample dataset subgroup from the sample dataset subgroups according to the second characteristic value corresponding to the target characteristic variable; and determining a credit score of the user according to a sub-scoring model corresponding to the sample dataset subgroup and the second characteristic values corresponding to the other characteristic variables.

12. The device according to claim 11, wherein determining the performance difference value between the trained regular scoring card model and the trained cross scoring card model comprises:

scoring the sample dataset with the trained regular scoring card model;

according to sample dataset scoring results scored by the trained regular scoring card model and to the sample label, determining a performance index value of the trained regular scoring card model;

scoring the sample dataset with the trained cross scoring card model;

according to sample dataset scoring results scored by the trained cross scoring card model and to the sample label, determining a performance index value of the trained cross scoring card model; and determining the performance difference value according to the performance index value of the trained regular scoring card model and the performance index value of the trained cross scoring card model.

13. The method of claim 1, wherein constructing the corresponding sub-scoring model for each of the sample dataset subgroups, comprises: training a regular scoring card model for each of the sample dataset subgroups.

14. The device of claim 7, wherein constructing the corresponding sub-scoring model for each of the sample dataset subgroups, comprises: training a regular scoring card model for each of the sample dataset subgroups.

15. The method of claim 5, wherein the sub-scoring model is a regular scoring card model trained for the sample dataset subgroup.

16. The device of claim 11, wherein the sub-scoring model is a regular scoring card model trained for the sample dataset subgroup.

* * * * *